United States Patent
Daigaku

(10) Patent No.: US 9,764,775 B2
(45) Date of Patent: Sep. 19, 2017

(54) VEHICLE LOWER PORTION STRUCTURE

(71) Applicant: TOYOTA JIDOSHA KABUSHIKI KAISHA, Toyota-shi, Aichi-ken (JP)

(72) Inventor: Koichi Daigaku, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/287,245

(22) Filed: Oct. 6, 2016

(65) Prior Publication Data
US 2017/0144711 A1    May 25, 2017

(30) Foreign Application Priority Data
Nov. 25, 2015 (JP) .................................. 2015-229988

(51) Int. Cl.
*B62D 25/20* (2006.01)
*B62D 21/02* (2006.01)
*B62D 25/02* (2006.01)

(52) U.S. Cl.
CPC ......... *B62D 25/2036* (2013.01); *B62D 21/02* (2013.01); *B62D 25/025* (2013.01)

(58) Field of Classification Search
CPC .................................................. B62D 25/2036
USPC ....................................... 296/187.08, 193.07
See application file for complete search history.

(56) References Cited

U.S. PATENT DOCUMENTS

| | | | | |
|---|---|---|---|---|
| 2011/0272969 A1* | 11/2011 | Mori | ...................... | B62D 25/20 296/193.07 |
| 2012/0038187 A1* | 2/2012 | Mori | ...................... | B62D 25/20 296/193.07 |
| 2012/0212009 A1* | 8/2012 | Ishizono | .............. | B62D 25/025 296/193.07 |
| 2012/0256448 A1* | 10/2012 | Yasui | ................... | B62D 21/152 296/209 |
| 2012/0274100 A1* | 11/2012 | Mildner | ............. | B62D 25/2036 296/193.07 |
| 2013/0257097 A1* | 10/2013 | Kojo | ...................... | B62D 21/15 296/187.08 |
| 2015/0145284 A1* | 5/2015 | Nishida | .............. | B62D 25/2036 296/187.1 |

FOREIGN PATENT DOCUMENTS

| | | | | |
|---|---|---|---|---|
| EP | 2003191 A1 * | 12/2008 | ......... | B62D 25/2036 |
| JP | 2010-137636 A | 6/2010 | | |
| JP | 2012-011856 A | 1/2012 | | |
| JP | 2013-136314 A | 7/2013 | | |

\* cited by examiner

*Primary Examiner* — Jason S Morrow
(74) *Attorney, Agent, or Firm* — Oliff PLC

(57) ABSTRACT

A vehicle lower portion structure has a floor panel, rockers, a floor tunnel, and beads. The floor panel forms a floor portion of the vehicle. The pair of rockers are disposed respectively on both outer sides in the vehicle transverse direction of the floor panel, and extend in the vehicle longitudinal direction. The floor tunnel is disposed in a central portion in the vehicle transverse direction of the floor panel, and extends in the vehicle longitudinal direction. The beads are formed protruding towards the vehicle upward side on the floor panel between the rockers and the floor tunnel such that ridgelines thereof extend in the vehicle longitudinal direction.

4 Claims, 7 Drawing Sheets

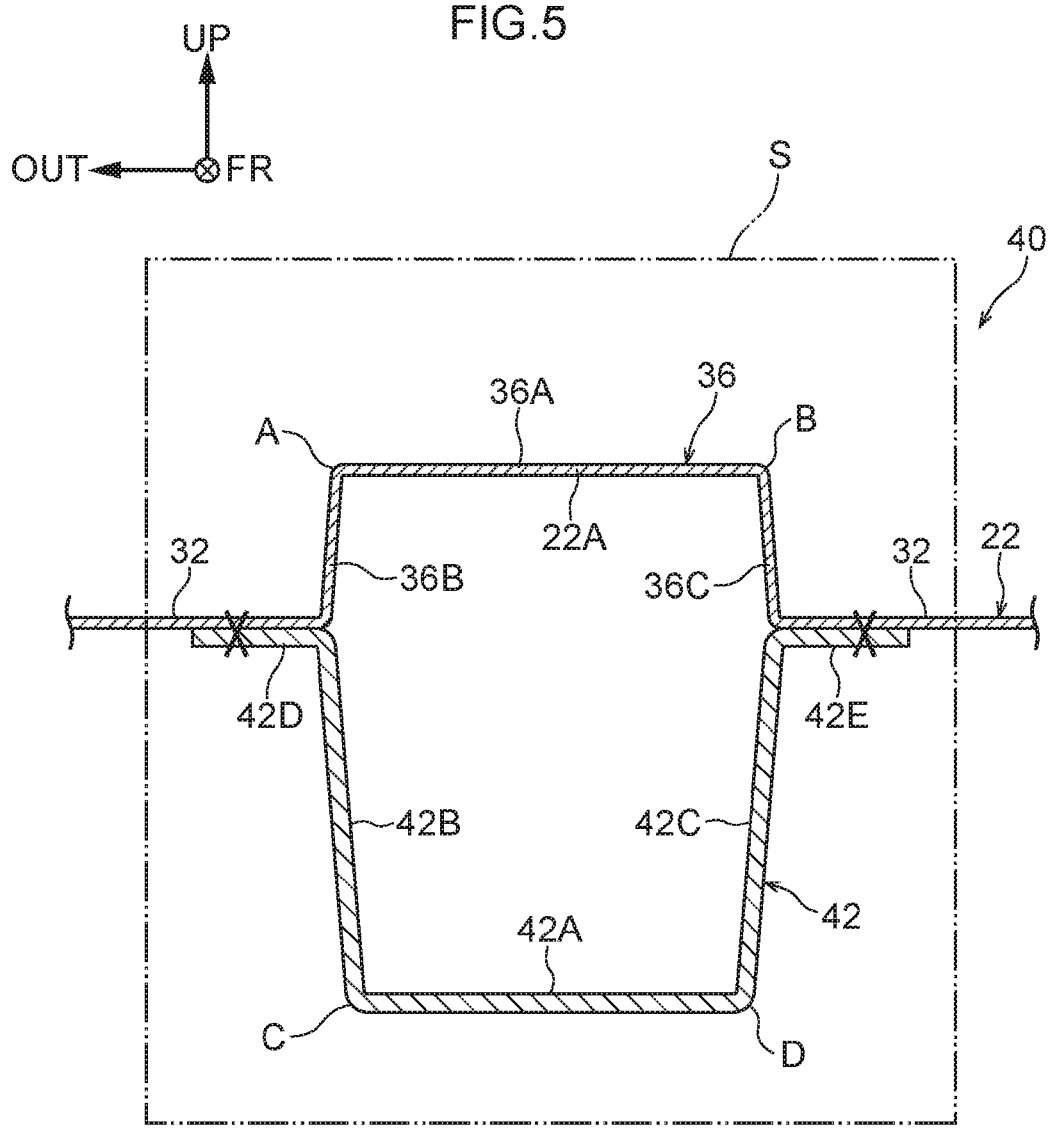

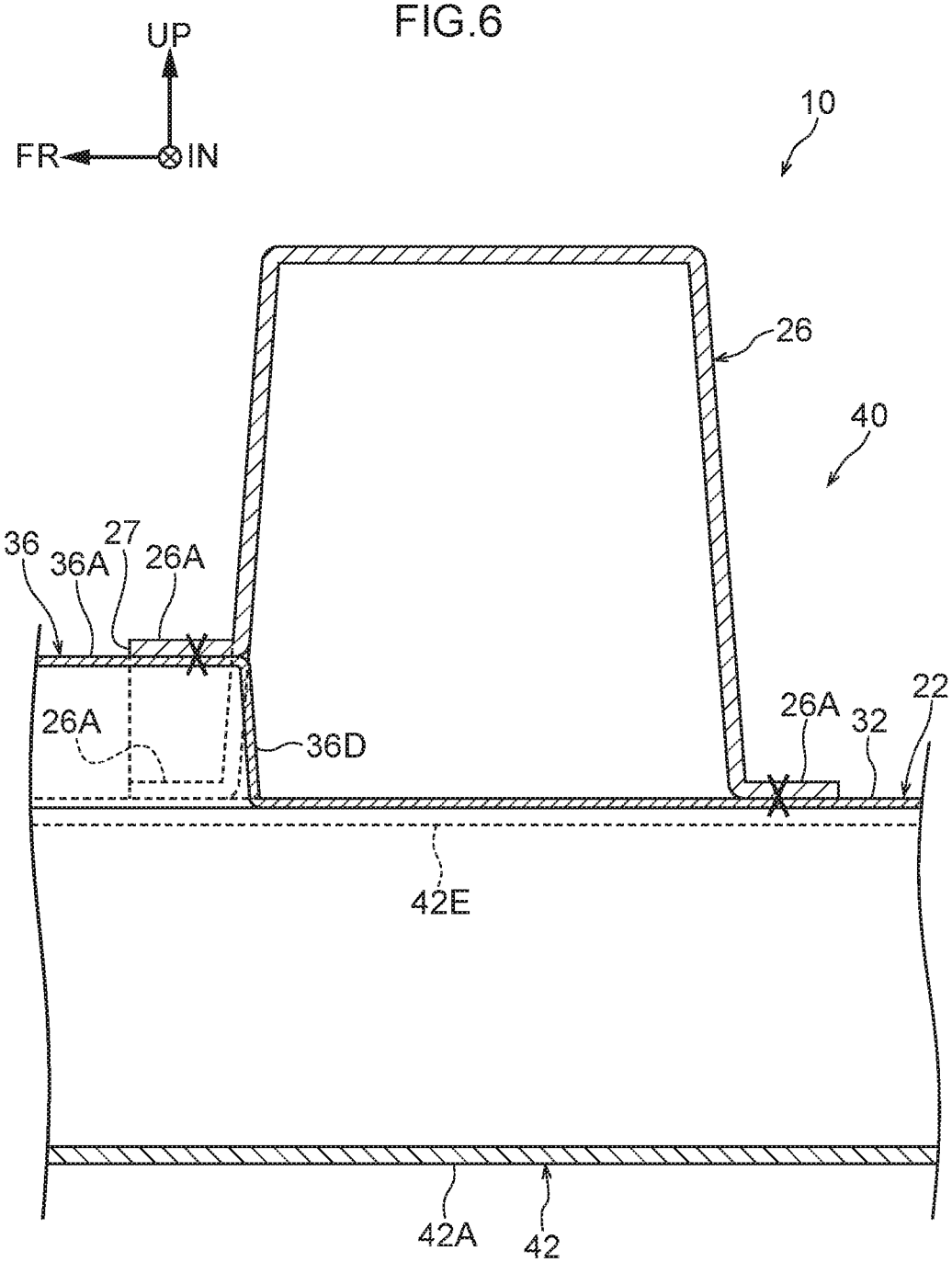

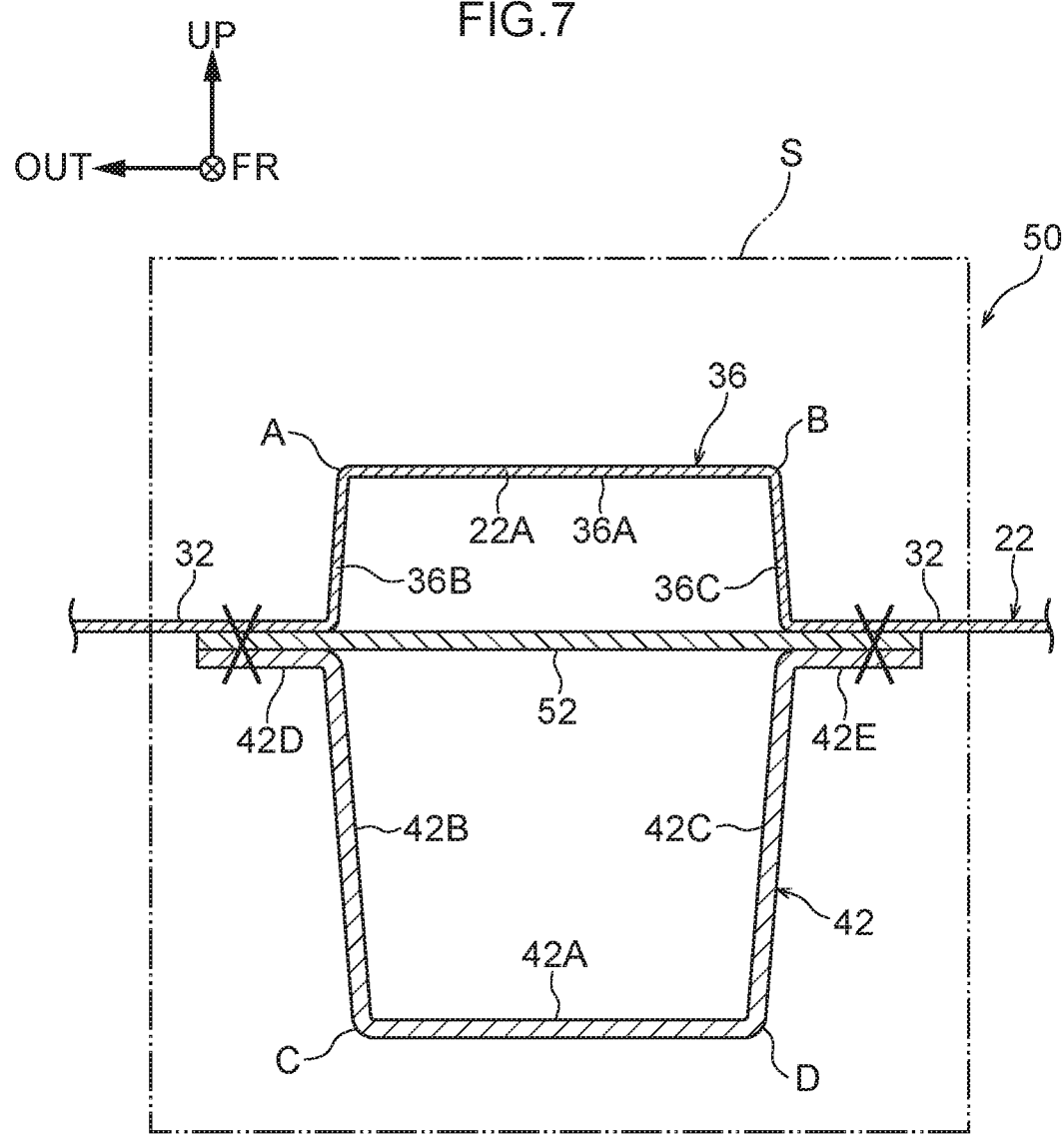

VEHICLE LOWER PORTION STRUCTURE

CROSS-REFERENCE TO RELATED APPLICATION

This application is based on and claims priority under 35 USC 119 from Japanese Patent Application No. 2015-229988 filed on Nov. 25, 2015, the disclosure of which is incorporated by reference herein.

BACKGROUND

Technical Field

The present invention relates to a vehicle lower portion structure.

Related Art

In Japanese Patent Application Laid-Open (JP-A) No. 2013-136314 (Patent document 1) there is disclosed a vehicle front portion structure that is provided with a reinforcement component having a reinforcement plate portion for a dash panel, a reinforcement plate portion for a floor panel, a reinforcement plate portion for a floor tunnel, and a reinforcement plate portion for a tire housing, and in which a tire housing bead is formed in the reinforcement plate portion for a tire housing.

However, in the above-described related art, because a structure is employed in which reinforcement is provided by joining the floor panel to a reinforcement component, in a structure in which, for example, the reinforcement component is joined to the floor panel by spot welding, it is difficult for the spaces between the spot welding points to contribute to the overall vehicle rigidity. Because of this, even if a reinforcement component is provided in the floor panel so that the mass is increased by the amount of this reinforcement component, it is still difficult for the mass of this reinforcement component to effectively add to the overall rigidity of the vehicle. In other words, there is room for improvement from the standpoint of lightening the vehicle weight while still guaranteeing sufficient vehicle rigidity.

SUMMARY

In consideration of the above-described circumstances, it is an object of the present invention to provide a vehicle lower portion structure that makes it possible to lighten the vehicle weight while still guaranteeing sufficient vehicle rigidity.

A vehicle lower portion structure according to a first aspect of the present invention has a floor panel that forms a floor portion of a vehicle, a pair of rockers that are disposed respectively on both outer sides in the vehicle transverse direction of the floor panel and extend in the vehicle longitudinal direction, a tunnel that is disposed in a central portion in the vehicle transverse direction of the floor panel and extends in the vehicle longitudinal direction, and reinforcement portions that are formed protruding towards the vehicle upward side on the floor panel between the rockers and the tunnel such that ridgelines thereof extend in the vehicle longitudinal direction.

BRIEF DESCRIPTION OF THE DRAWINGS

Exemplary embodiments of the present invention will be described in detail based on the following figures, wherein:

FIG. 5 is a vertical cross-sectional view (taken along a line 5-5 in FIG. 4) of a floor panel bead according to the second exemplary embodiment.

FIG. 6 is a vertical cross-sectional view (taken along a line 6-6 in FIG. 4) of a join portion between a floor panel and a floor cross member according to the second exemplary embodiment.

FIG. 7 is a vertical cross-sectional view of a floor panel bead according to a third exemplary embodiment.

DETAILED DESCRIPTION

Figure 1:
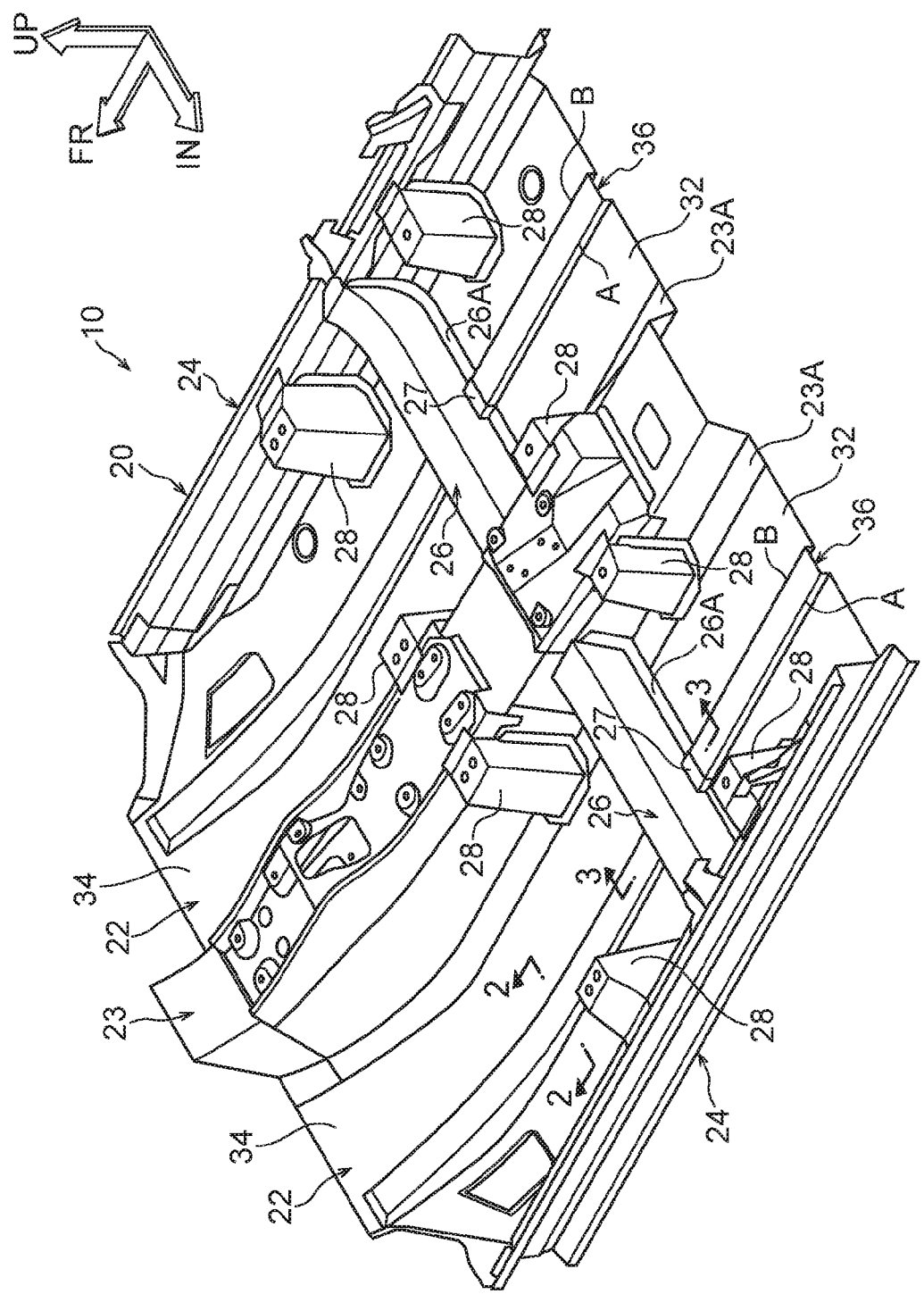
FIG. 1 is an explanatory view showing a lower portion of a vehicle to which the vehicle lower portion structure according to a first exemplary embodiment has been applied.

Hereinafter, first, second, and third exemplary embodiments of a vehicle lower portion structure according to the present invention, as well as variant examples thereof will be described with reference made to FIG. 1 through FIG. 7. Note that an arrow FR, an arrow UP, an arrow IN, and an arrow OUT that are shown where appropriate in the drawings respectively indicate a vehicle forward side (in the direction of forward travel), a vehicle upward side, an inner side in a vehicle transverse direction, and an outer side in the vehicle transverse direction. Hereinafter, unless specifically stated otherwise, if simple longitudinal, vertical, or lateral directions are used, then these refer respectively to the front-rear direction of the vehicle, the up-down direction of the vehicle, and the left-right direction of the vehicle transverse direction when the vehicle is facing in the direction of travel. In addition, a mark X in the drawings represents a spot weld.

First Exemplary Embodiment

A part of a lower portion of a vehicle 10 is shown in FIG. 1. The vehicle 10 has a vehicle lower portion structure 20. The vehicle lower portion structure 20 is constructed so as to include floor panels 22, a floor tunnel 23, rockers 24, floor cross members 26, and eight seat brackets 28. Note that because the vehicle 10 and the vehicle lower portion structure 20 fundamentally have a lateral symmetrical structure, the left side of the vehicle 10 and the left side of the vehicle lower portion 20 are described, and any description of the vehicle lower portion structure 20 on the right side is omitted.

The rockers 24 are disposed respectively on both outer sides in the vehicle transverse direction of the floor panels 22 (described below), and extend in the vehicle longitudinal direction. Namely, a pair of the rockers 24 are provided. Specifically, an end portion on the outer side in the vehicle transverse direction of the floor panel 22 is joined by spot-welding or the like to a bottom portion of an inner side surface in the vehicle transverse direction of an inner panel of the rocker 24. Note that in FIG. 1, out of the outer panel and the inner panel that make up the rocker 24, only the inner panel is shown, and the outer panel has been omitted from the drawings.

The floor cross members 26 extend in the vehicle transverse direction on top of the floor panels 22 and, when viewed from the vehicle transverse direction (i.e., when seen in a vehicle side view), are formed in a hat shape that is open on the vehicle lower side. Each floor cross member 26 is joined to the floor panels 22 via a pair of flanges 26A that are spot-welded or the like to the floor panel 22. As a result, a closed cross-section is formed by the floor cross member 26 and the floor panels 22. The floor cross members 26 also connect the rockers 24 and the floor tunnel 23 (described below) together in the vehicle transverse direction. In addition, a recessed portion 27 that is hollowed out towards the upper side in the vehicle vertical direction is formed in a lower portion in the center in the vehicle transverse direction of each floor cross member 26, and this recessed portion 27 matches the external shape of a bead 36 (described below) of the floor panel 22.

The seat brackets 28 are components on which rails are mounted that are used to enable a seat (not shown) to slide back and forth. Seat brackets 28 are joined respectively to the floor tunnel 23 and the rockers 24 on the front side and the rear side in the vehicle longitudinal direction of the floor cross members 26 on top of the floor panels 22 (described below).

The floor tunnel 23 is an example of a tunnel, and is disposed in a central portion in the vehicle transverse direction of the floor panels 22. The floor tunnel 23 is formed by press-working a steel plate, and extends in the vehicle longitudinal direction. Specifically, the floor tunnel 23 is formed in a hat shape that is open on the vehicle lower side when viewed from the vehicle longitudinal direction. Furthermore, flanges 23A that are joined to the floor panels 22 are formed at both end portions in the vehicle transverse direction of the floor tunnel 23. The flanges 23A and end portions on the inner side in the vehicle transverse direction of the floor panels 22 are formed as a single integral body by being joined to each other by means of spot welding or the like. Note that it is also possible for the two floor panels 22 and the single floor tunnel 23 to be formed as a single integral body by press-working a single steel plate.

[Floor Panels]

The floor panels 22 are formed by press-working a steel plate, and extend in both the vehicle longitudinal direction and the vehicle transverse direction at a lower portion of the vehicle 10 so as to form a floor portion of the vehicle 10. Specifically, each floor panel 22 has a planar portion 32, a curved portion 34, and a bead 36 that serves as an example of a reinforcement portion. Furthermore, a pair of floor panels 22 are provided, with one floor panel 22 being disposed on one side (i.e., the driver's seat side) and another floor panel 22 being disposed the other side (i.e., the passenger's seat side) in the vehicle transverse direction of the floor tunnel 23. Note that a rear floor panel (not shown in the drawings) is joined to a rear end portion in the vehicle longitudinal direction of the floor panels 22 and the floor tunnel 23.

(Planar Portion and Curved Portion)

The planar portion 32 extends in both the vehicle longitudinal direction and the vehicle transverse direction so as to include a section from a position where the seat brackets 28 are provided on the front side in the vehicle longitudinal direction to a position where the seat brackets 28 are provided on the rear side in this direction. The curved portion 34 is curved from a front end portion in the vehicle longitudinal direction of the planar portion 32 such that a distal end thereof moves towards the vehicle upwards side as it moves towards the vehicle forward side.

(Beads)

The beads 36 extend in the vehicle longitudinal direction and are formed, as one example, so as to span across both the planar portion 32 and the curved portion 34 of each floor panel 22. Namely, when viewed from the vehicle transverse direction, the beads 36 have a portion that is rectilinear in the vehicle longitudinal direction, and a portion that curves towards the vehicle upward side at a front end portion thereof in the vehicle longitudinal direction. Note that the front end in the vehicle longitudinal direction of each bead 36 is offset further to the rear side than the front end of the curved portions 34. The reason for this is so as to ensure an adequate length for a join portion where the dash panel (not shown in the drawings) is joined to the front end portion of the floor panels 22. As an example, the beads 36 extend as far as the rear end of the floor panels 22.

Figure 2:
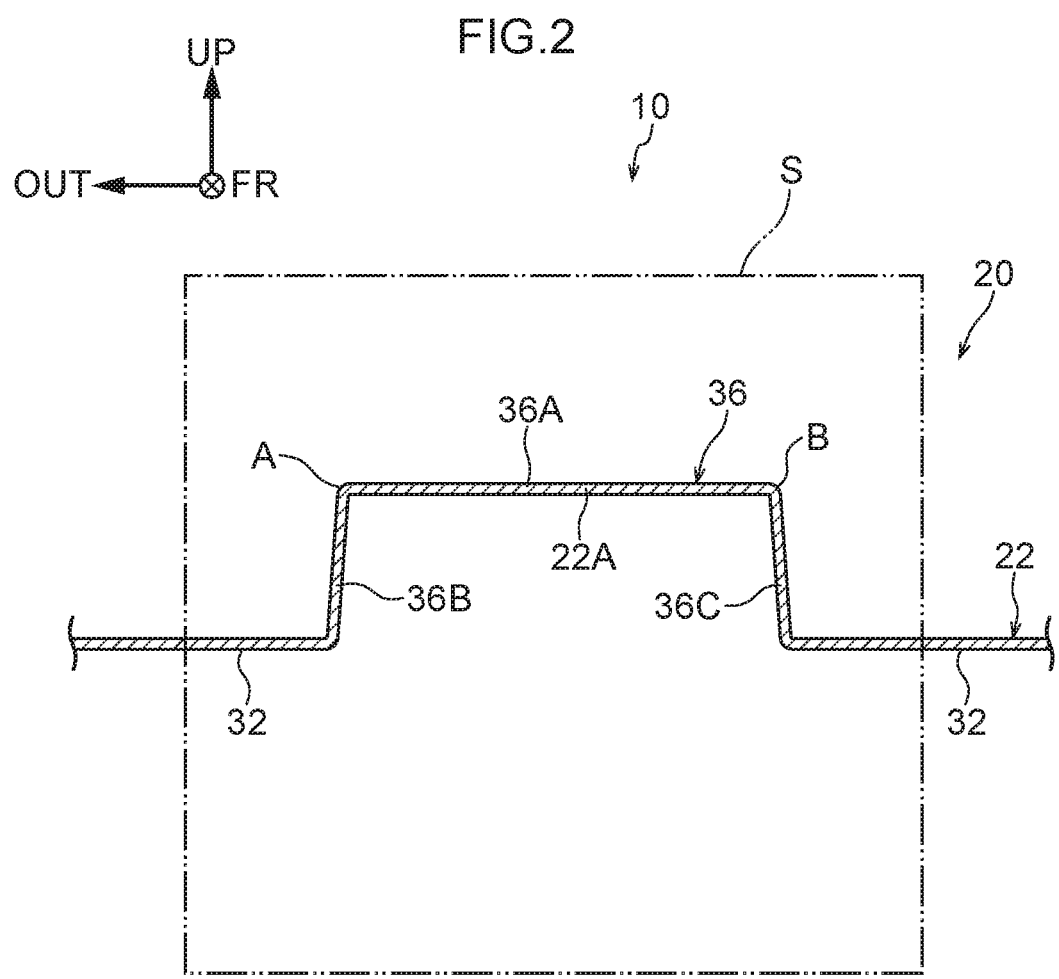
FIG. 2 is a vertical cross-sectional view (taken along a line 2-2 in FIG. 1) of a floor panel bead according to the first exemplary embodiment.

As is shown in FIG. 2, when viewed from the vehicle longitudinal direction, the beads 36 have a base portion 36A and vertical walls 36B and 36C. In other words, when viewed from the vehicle longitudinal direction, the beads 36 are projecting ridges that protrude towards the upper side in the vehicle vertical direction, and are formed in a hat shape that is open on the lower side in the vehicle vertical direction. Specifically, the base portion 36A runs parallel with both the vehicle transverse direction and the vehicle longitudinal direction. Moreover, the height in the vehicle vertical direction of the base portion 36A (i.e., the height thereof above the planar portion 32) is lower than the height in the vehicle vertical direction of the floor cross members 26 (described above—see FIG. 1).

The pair of vertical walls 36B and 36C that extend towards the lower side in parallel with the vehicle vertical direction are formed at both end portions in the vehicle transverse direction of the base portion 36A. The vertical wall 36A is positioned on the outer side in the vehicle transverse direction of the base portion 36A, while the vertical wall 36B is positioned on the inner side in the vehicle transverse direction of the base portion 36A. Lower end portions of the vertical walls 36B and 36C are connected to (are formed integrally with) the planar portions 32. Here, an outer side portion at a boundary between the base portion 36A and the vertical wall 36B of the beads 36 is referred to as ridgeline A, while an outer side portion at a boundary between the base portion 36A and the vertical wall 36C is referred to as ridgeline B. Ridgeline A and ridgeline B extend in the vehicle longitudinal direction.

In the beads 36, by forming a hat shape, a second moment of area relative to deformation in the vehicle longitudinal direction of a cross-section 22A of a floor panel 22 within a plane S that is orthogonal to the vehicle longitudinal direction (i.e., a plane that is parallel with both the vehicle vertical direction and the vehicle transverse direction) increases in comparison to the planar portions 32. In other words, the beads 36 are formed such that the ridgeline A and the ridgeline B extend in the vehicle longitudinal direction on the floor panel 22 between the rockers 24 (see FIG. 1) and the floor tunnel 23 (see FIG. 1), and consequently increase the rigidity of the cross-section 22A. Note that in the first exemplary embodiment, components such as members and reinforcements that are used to provide reinforcement are not provided on the lower side in the vehicle vertical direction of the beads 36 in the floor panels 22.

Figure 3:
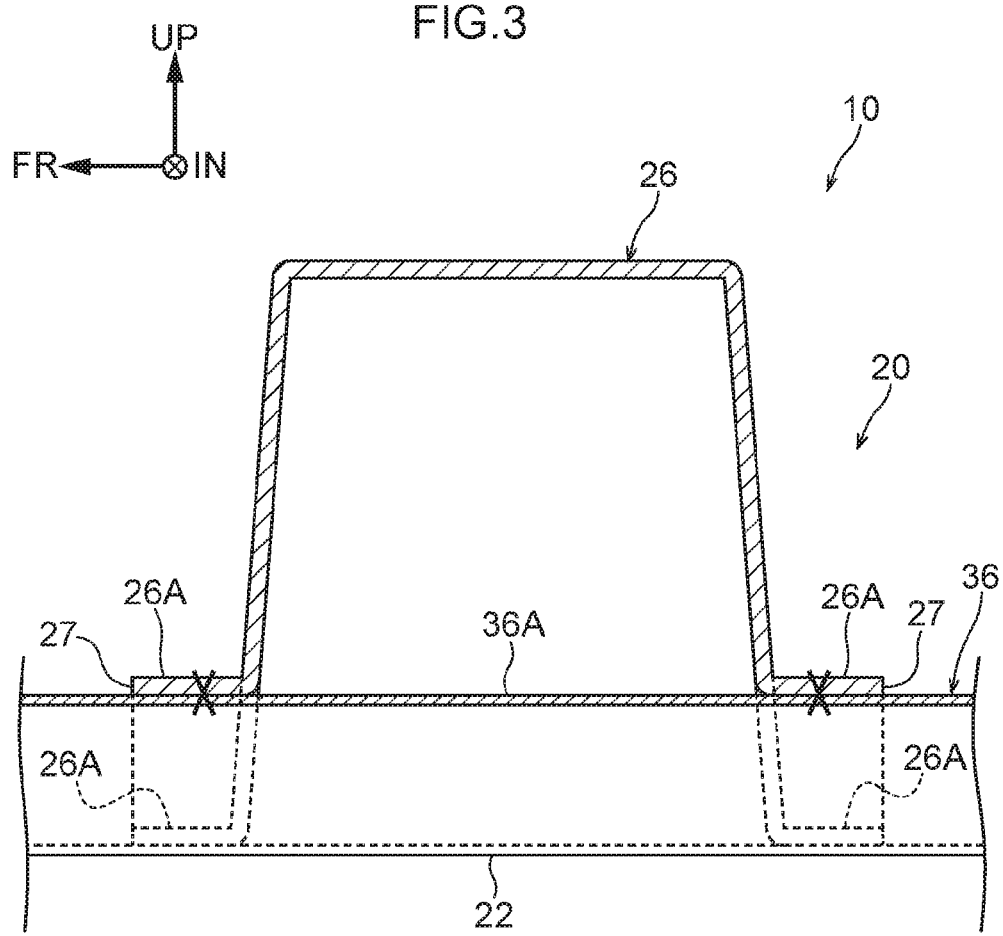
FIG. 3 is a vertical cross-sectional view (taken along a line 3-3 in FIG. 1) of a join portion between a floor panel and a floor cross member according to the first exemplary embodiment.

As is shown in FIG. 3, each bead 36 penetrates in the vehicle longitudinal direction a lower portion in the vehicle vertical direction (i.e., the recessed portions 27 described above) of the floor cross member 26. Moreover, the flanges 26A of the recessed portions 27 in the floor cross member 26 are superimposed from the upper side in the vehicle vertical direction onto the base portion 36A of the beads 36 in portions of the bead 36 that lie opposite the recessed portions 27 in the vehicle vertical direction, and are joined thereto by means of spot-welding or the like.

(Action and Effects)

Next, the action and effects of the vehicle lower portion structure 20 of the first exemplary embodiment will be described.

In the vehicle lower portion structure 20 shown in FIG. 2, as has been described above, when considering the second moment of area relative to deformation in the vehicle longitudinal direction of the cross-section 22A of the floor panel 22, the second moment of area in the bead 36 is greater than the second moment of area in the planar portion 32. Namely, in the vehicle lower portion structure 20, the planar portions 32 of the floor panels 22 are reinforced as a result of the beads 36 being formed. As a consequence, compared with a structure in which the floor panels 22 are formed solely by the planar portion 32, it is easier to provide resistance to a collision load acting on a floor panel 22 during a frontal collision of the vehicle 10, so that the rigidity of the vehicle 10 can be guaranteed. Furthermore, in the vehicle lower portion structure 20, because it is possible to guarantee rigidity solely via the floor panels 22 themselves, it is possible to suppress any increase in mass that would occur if separate components (i.e., reinforcements) were provided in order to reinforce the floor panels 22. As a result, a reduction in the weight of the vehicle 10 can be achieved.

In the vehicle lower portion structure 20, a structure is employed in which the collision load that was borne by a conventional reinforcement during a frontal collision is borne by the actual floor panels 22 themselves. As a result, the mass of the reinforcement, which hitherto was only of any use during a collision, is part of the overall mass of the vehicle 10 irrespective of whether the vehicle 10 is in a collision or not, and is used to raise the rigidity of the vehicle 10. Because of this, it is possible to suppress vibration that is generated when the vehicle 10 is traveling. In other words, in the vehicle lower portion structure 20, it is possible to improve the riding comfort of the vehicle 10, and to also improve the steering stability of the vehicle 10.

In the vehicle lower portion structure 20, because it is sufficient for the beads 36 to be formed in the floor panels 22 by press-working, compared with a conventional structure in which a reinforcement is joined to the floor panel, it is possible to reduce the number of man-hours required for tasks such as painting and welding. Specifically, it is possible to reduce the amount of body sealer that is used, and to reduce the number of panel fittings as well as the number of weld points. As a result, it is possible to raise the productivity of the vehicle 10, and to also reduce the costs required to manufacture the vehicle 10.

In addition, in the vehicle lower portion structure 20, because the ridgelines A and B of the beads 36 are formed in parallel with the vehicle longitudinal direction, a collision load that is input from the vehicle forward side during a frontal collision of the vehicle 10 can be transmitted efficiently to the vehicle rearward side along the ridgelines A and B. As a result, it is possible to suppress the amount of deformation of the front portion of the vehicle 10. Moreover, in the vehicle lower portion structure 20, because the beads 36 extend as far as the rear end portion in the vehicle longitudinal direction of the floor panels 22, it is possible to more efficiently transmit a collision load to the vehicle rearward side compared to a structure in which the rear end portion of the beads 36 is located in a central portion in the vehicle longitudinal direction of the floor panels 22.

In the vehicle lower portion structure 20 shown in FIG. 3, the beads 36 and the floor cross members 26 are joined together. Because of this, when the vehicle 10 is in a frontal collision, a portion of a collision load that is input into the floor cross members 26 from the vehicle transverse direction is transmitted to the beads 36 via the join portion between the floor cross members 26 and the beads 36. As a result, compared to a structure in which the floor cross members 26 and the beads 36 are not joined together, it is possible to improve the rigidity of the vehicle 10 in response to the input of collision load during a side collision.

Second Exemplary Embodiment

Next, a vehicle lower portion structure 40 according to a second exemplary embodiment will be described.

Figure 4:
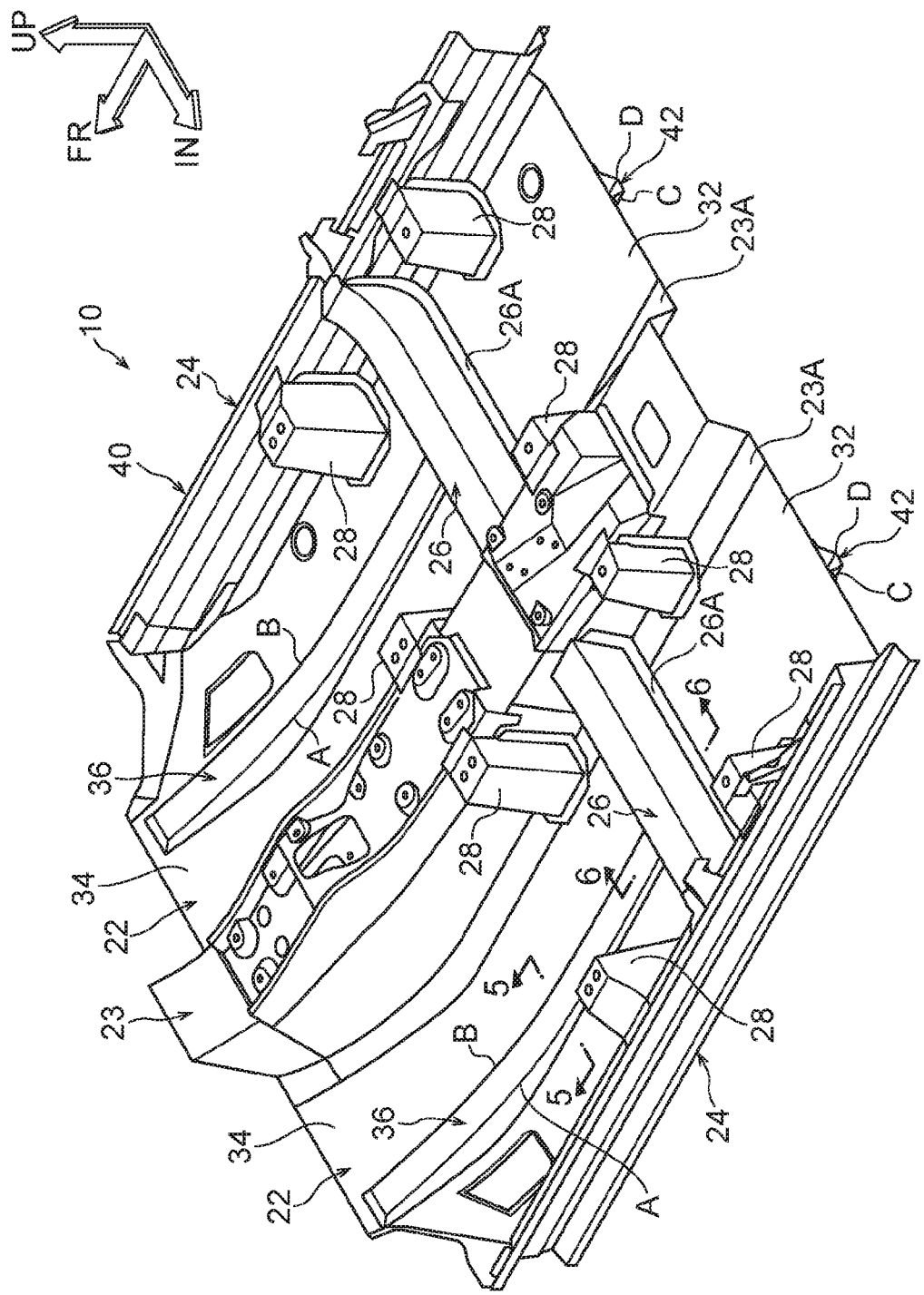
FIG. 4 is an explanatory view showing a lower portion of a vehicle to which the vehicle lower portion structure according to a second exemplary embodiment has been applied.

A vehicle lower portion structure 40 is shown in FIG. 4. The vehicle lower portion structure 40 is provided in the vehicle 10 instead of the vehicle lower portion structure 20 (see FIG. 1), and has the floor panels 22 and also floor lower members 42 that serve as an example of a reinforcement component. Note that components and portions that are fundamentally the same as in the above-described first exemplary embodiment are given the same symbols as in the first exemplary embodiment and any description thereof is omitted.

(Floor Lower Member)

The floor lower member 42 shown in FIG. 5 is a component that extends in the vehicle longitudinal direction on the underside of the beads 36 on the floor panels 22 and, when viewed from the vehicle longitudinal direction, has a base portion 42A, vertical walls 42B and 42C, and flanges 42D and 42E. Together with the bead 36, the floor lower member 42 increases the area of the cross-section 22A of the floor panel 22. In other words, the floor lower members 42 have the function of increasing (i.e., reinforcing) even further the rigidity of the portions where the beads 36 are formed on the floor panels 22.

Each base portion 42A is formed in a plate shape that runs parallel with the vehicle transverse direction. The vertical walls 42B and 42C extend towards the upper side in parallel with the vehicle vertical direction from both end portions in the vehicle transverse direction of the base portion 42A. Namely, the front lower member 42 is formed in a hat shape whose cross-sectional configuration when viewed from the vehicle longitudinal direction is open on the upper side in the vehicle vertical direction.

The flanges 42D and 42E extend outwards and inwards respectively in the vehicle transverse direction from a top end in the vehicle vertical direction of vertical walls 42B and 42C. The flanges 42D and 42E are superimposed from the lower side in the vehicle vertical direction onto edge portions on both sides in the vehicle transverse direction of the bead 36 in the floor panel 22, and are joined thereto by means of spot-welding or the like. Note that, when the floor lower members 42 are viewed from the vehicle longitudinal direction, an outer side portion of a boundary between the base portion 42A and the vertical wall 42B is referred to as a ridgeline C, while an outer side portion of a boundary between the base portion 42A and the vertical wall 42C is referred to as a ridgeline D. In this way, as a result of being joined to the floor panel 22, together with the bead 36 the floor lower member 42 forms a closed cross-sectional structure (including the ridgelines A, B, C, and D) within the cross-section 22A (i.e., within the plane S).

As is shown in FIG. 6, in the second exemplary embodiment, a rear end portion in the vehicle longitudinal direction of each bead 36 is disposed in a position where it overlaps in the vehicle vertical direction with the flange 26A on the front side of the floor cross member 26. Namely, the beads 36 of the second exemplary embodiment do not penetrate in the vehicle longitudinal direction the lower portion in the vehicle vertical direction of the floor cross members 26. In addition, the rear end portion of each bead 36 is closed off by a rear wall 36D. Furthermore, in the second exemplary embodiment, the flanges 26A of the recessed portion 27 on the front side in the vehicle longitudinal direction of the floor cross members 26 are superimposed from the upper side in the vehicle vertical direction on the base portions 36A of the rear end portion of the bead 36, and are joined thereto by spot-welding or the like. Note that the flanges 26A on the rear side in the vehicle longitudinal direction of the floor cross members 26 are superimposed from the upper side in the vehicle vertical direction on the planar portions 32 of the floor panels 22, and are joined thereto by spot-welding or the like.

(Action and Effects)

Next, the action and effects of the vehicle lower portion structure 40 of the second exemplary embodiment will be described.

In the vehicle lower portion structure 40 shown in FIG. 5, in addition to the action and effects of the beads 36 that are described above, the floor lower members 42 increase the area of the cross-section 22A of the floor panels 22, and form a closed cross-section together with the beads 36. Namely, because the second moment of area relative to deformation in the vehicle longitudinal direction of the cross-section 22A of the floor panel 22 is greater in comparison to a structure in which the floor lower members 42 are not provided, it is possible to improve the rigidity of the vehicle 10 even further. Moreover, because the floor lower member 42 connects the edge portions on both sides in the vehicle transverse direction of each bead 36, it becomes difficult for the cross-sectional configuration of the beads 36 in the cross-section 22A to change (i.e., it becomes difficult for cross-section collapse to occur). In other words, it becomes difficult for the lower portions of the vertical walls 36B and 36C to be opened up in the vehicle transverse direction.

In the vehicle lower portion structure 40 shown in FIG. 6, the beads 36 and the floor cross members 26 are joined together. Because of this, during a side collision of the vehicle 10, a portion of a collision load that is input into the floor cross members 26 from the vehicle transverse direction is transmitted to the beads 36 via the join portion between the floor cross members 26 and the beads 36. As a result, compared to a structure in which the floor cross members 26 and the beads 36 are not joined together, it is possible to improve the rigidity of the vehicle 10 in response to the input of collision load during a side collision.

Third Exemplary Embodiment

Next, a vehicle lower portion structure 50 according to a third exemplary embodiment will be described.

A vehicle lower portion structure 50 is shown in FIG. 7. The vehicle lower portion structure 50 has a structure in which a shear plate 52 is additionally provided as an example of a linking component in the vehicle lower portion structure 40 of the second embodiment (see FIG. 5). Note that components and portions that are fundamentally the same as in the above-described first and second exemplary embodiments are given the same symbols as in the first and second exemplary embodiments and any description thereof is omitted.

(Shear Plate)

The shear plate 52 is provided between the floor lower member 42 and the floor panel 22 (i.e., the bead 36), and links together in the vehicle transverse direction the join portions where the floor lower member 42 is joined to the floor panel 22 (i.e., the portions where the flanges 42D and 42E are joined to the floor panel 22).

Specifically, the shear plate 52 is a plate-shaped component, and is disposed in parallel with both the vehicle longitudinal direction and the vehicle transverse direction. When viewed from the vehicle vertical direction (i.e., in a plan view), the shear plate 52 is provided in an area where the bead 36 overlaps with the floor lower member 42. Furthermore, the shear plate 52 is superimposed from the lower side in the vehicle vertical direction with edge portions on both sides in the vehicle transverse direction of the bead 36, and in this state of being sandwiched between the floor panel 22 and the flanges 42D and 42E, is joined to the floor panel 22 and the floor lower member 42 by spot-welding or the like. Namely, the shear plate 52 is provided such that it partitions the closed cross-section that is formed by the bead 36 and the floor lower member 42 into an upper side and a lower side in the vehicle vertical direction.

(Action and Effects)

Next, the action and effects of the vehicle lower portion structure 50 of the third exemplary embodiment will be described.

In the vehicle lower portion structure 50, in addition to the action and effects of the beads 36 and the floor lower members 42 that are described above, the shear plate 52 links together the join portions where the floor panel 22 is joined to the floor lower member 42. As a result, during a frontal collision of the vehicle 10 (see FIG. 1), a portion of a collision load that attempts to deform the bead 36 and the floor lower member 42 in the vehicle transverse direction is borne by the shear plate 52. Because of this, it becomes difficult for the cross-sectional configuration of the beads 36 and the floor lower member 42 to change (i.e., it becomes difficult for cross-section collapse to occur). In other words, because the cross-sectional configuration of the closed cross-section formed by the floor panel 22 and the floor lower member 42 can be maintained by the shear plate 52, it is possible for the rigidity of the vehicle 10 to be improved even more in comparison to a structure in which the shear plate 52 is not provided.

Note that the present invention is not limited to the above-described exemplary embodiments.

It is also possible for the floor panels 22 to be formed by differential thickness bonding such that the thickness in the vehicle vertical direction of the front side in the vehicle longitudinal direction of the floor panels 22 is thicker than the thickness in the vehicle vertical direction of the rear side thereof. For example, it is also possible to form the front side of the floor panels 22 from a plate material having a plate thickness of 1.2 mm (980 material: ultra high tensile strength steel plate), and to form the rear side of the floor panels 22 from a plate material having a plate thickness of 1.0 mm (440 material: high tensile strength steel plate), and to bond these two together. It is also possible to form the floor panels 22 by bonding together the same materials having different thicknesses, or by bonding together different materials having the same thickness.

The configuration of the bead 36 within the cross-section 22A (i.e., within the plane S) is not limited to being hat-shaped, and may also be a rectangular configuration or another polygonal configuration. Additionally, the configuration of the bead 36 within the cross-section 22A may also include a circular arc (i.e., may also include a curved surface). Furthermore, the number of beads 36 that are formed in each floor panel 22 on either side of the floor tunnel 23 is not limited to one, and plural beads 36 may also be formed in each floor panel 22. In addition, the end portions in the vehicle longitudinal direction of the beads 36 may be either closed or open.

The method used to join the floor lower members 42 to the floor panels 22 is not limited to spot-welding, and they may also be joined together by welding (i.e., laser welding or the like). Moreover, the configuration of the front lower member 42 within the cross-section 22A is not limited to being hat-shaped, and may also be a rectangular configuration or another polygonal configuration. Furthermore, the configuration of the front lower member 42 within the cross-section 22A may also include a circular arc (i.e., may also include a curved surface). Additionally, it is also possible to provide the floor lower members 42 on the lower side of the beads 36 that penetrate the floor cross members 26 of the first exemplary embodiment such that the floor lower members 42 match the positions of the beads 36.

The shear plates 52 are not limited to being planar in the vehicle transverse direction, and it is also possible for them to be shaped such that a central portion thereof in the vehicle transverse direction protrudes towards either the upper side or the lower side in the vehicle vertical direction. The number of shear plates 52 is also not limited to one, and it is also possible for plural shear plates 52 to be provided.

In the vehicle lower portion structures 20, 40, and 50, it is also possible to employ a structure in which the floor cross members 26 and the beads 36 are not joined together.

A vehicle lower portion structure according to exemplary embodiment of the present invention as well as variant examples thereof have been described above, however, these exemplary embodiments and variant examples thereof may also be used in other suitable combinations. It should be understood that the present invention may be achieved in a variety of modes insofar as these do not depart from the spirit or scope of the present invention.

In the vehicle lower portion structure according to the first aspect of the present invention, reinforcement portions are formed protruding towards the vehicle upward side in a portion of the floor panel between the rockers and the tunnel such that ridgelines thereof extend in the vehicle longitudinal direction. The second moment of area relative to deformation in the vehicle longitudinal direction of a cross-section that is orthogonal to the vehicle longitudinal direction of the reinforcement portions is greater than the second moment of area relative to deformation in the vehicle longitudinal direction of a cross-section that is orthogonal to the vehicle longitudinal direction of the planar portions of the floor panel. As a result, the reinforcement portions are able to provide more resistance to a collision load that acts on the floor panel during a vehicle frontal collision compared to a structure in which the floor panel is formed by a planar portion alone. As a consequence, the vehicle rigidity can be guaranteed.

Ridgelines that are aligned in the vehicle longitudinal direction are also formed in the reinforcement portions. Because of this, a collision load during a frontal collision can be efficiently transmitted to the vehicle rearward side through the ridgelines in the reinforcement portions. Furthermore, because the reinforcement portions are part of the floor panel and rigidity can be guaranteed solely via the floor panel itself, any increase in mass that would occur if separate reinforcement portions were provided in the floor panel is suppressed, so that the vehicle can be made more lightweight.

In a vehicle lower portion structure according to a second aspect of the present invention, reinforcement components that are bonded to the floor panel from a lower side in the vehicle vertical direction are provided on the lower side of the reinforcement portions in the floor panel, and, in a cross-section that is orthogonal to the vehicle longitudinal direction, form a closed cross-section together with the reinforcement portions.

In the vehicle lower portion structure according to the second aspect of the present invention, the reinforcement components form a closed cross-section in a cross-section of the floor panel that is orthogonal to the vehicle longitudinal direction, and it is possible to increase the area of this closed cross-section compared to a structure in which there are no reinforcement components. Because of this, the second moment of area relative to deformation in the vehicle longitudinal direction of those portions of the floor panel where the reinforcement portions are formed increases, and the vehicle rigidity can be improved.

In a vehicle lower portion structure according to a third aspect of the present invention, a linking component that links together in the vehicle transverse direction join portions where the reinforcement components are joined to the floor panel is provided between the reinforcement components and the floor panel.

In the vehicle lower portion structure according to the third aspect of the present invention, as a result of the linking component linking together the join portions where the reinforcement components are joined to the floor panel, it becomes difficult for the cross-sectional configuration that is formed by the reinforcement portions of the floor panel and the reinforcement components to collapse. In other words, because the cross-sectional configuration that is formed by the floor panel and the reinforcement components can be maintained, the vehicle rigidity can be improved even further.

In a vehicle lower portion structure according to a fourth aspect of the present invention, floor cross members that connect the rockers and the tunnel together in the vehicle transverse direction are provided on the floor panel, and a portion in the vehicle longitudinal direction of the reinforcement portions is joined to the cross members.

In the vehicle lower portion structure according to the fourth aspect of the present invention, a portion of a collision load that is input into the floor cross members during a vehicle side collision is transmitted to the reinforcement portions via the join portion between the floor cross members and the reinforcement portions. As a result, compared to a structure in which the floor cross members and the reinforcement portions are not joined together, it is possible to improve the rigidity of the vehicle in response to the input of collision load during a side collision.

As has been described above, according to the vehicle lower portion structure according to the first aspect, the excellent effect is achieved that it is possible to lighten the vehicle weight while still guaranteeing sufficient vehicle rigidity.

According to the vehicle lower portion structure according to the second aspect, the excellent effect is achieved that it is possible to improve the rigidity of a vehicle.

According to the vehicle lower portion structure according to the third aspect, the excellent effect is achieved that it is possible to further improve the rigidity of a vehicle.

According to the vehicle lower portion structure according to the fourth aspect, the excellent effect is achieved that it is possible to improve the rigidity of a vehicle against an input of a collision load during a side collision.

What is claimed is:

1. A vehicle lower portion structure comprising:
   a floor panel that forms a floor portion of a vehicle;
   a pair of rockers that are disposed respectively on both outer sides in the vehicle transverse direction of the floor panel, and extend in the vehicle longitudinal direction;
   a tunnel that is disposed in a central portion in the vehicle transverse direction of the floor panel, and extends in the vehicle longitudinal direction; and
   reinforcement portions that are formed protruding towards the vehicle upward side on the floor panel between the rockers and the tunnel such that ridgelines thereof extend in the vehicle longitudinal direction from a front end of the floor panel to a rear end of the floor panel,
   wherein a linking plate that links together, in the vehicle transverse direction, join portions where the reinforcement components are joined to the floor panel is provided between the reinforcement components and the floor panel.

2. The vehicle lower portion structure according to claim 1, wherein reinforcement components that are bonded to the floor panel from a lower side in the vehicle vertical direction are provided on the lower side of the reinforcement portions in the floor panel, and that, in a cross-section that is orthogonal to the vehicle longitudinal direction, form a closed cross-section together with the reinforcement portions.

3. The vehicle lower portion structure according to claim 1, wherein floor cross members that connect the rockers and the tunnel together in the vehicle transverse direction are provided on the floor panel, and
   a portion in the vehicle longitudinal direction of the reinforcement portions is joined to the cross members.

4. The vehicle lower portion structure according to claim 2, wherein floor cross members that connect the rockers and the tunnel together in the vehicle transverse direction are provided on the floor panel, and
   a portion in the vehicle longitudinal direction of the reinforcement portions is joined to the cross members.

* * * * *